(12) United States Patent
Amba et al.

(10) Patent No.: US 11,488,775 B2
(45) Date of Patent: Nov. 1, 2022

(54) SYSTEMS AND METHODS FOR FORMING MAGNET WIRE INSULATION WITH THERMOSET MATERIAL

(71) Applicant: Essex Group, Inc., Fort Wayne, IN (US)

(72) Inventors: Rakshit Amba, Hyderabad (IN); Matthew Leach, Fort Wayne, IN (US); M. Mazhar Said, Arlington Heights, IL (US)

(73) Assignee: ESSEX FURUKAWA MAGNET WIRE USA LLC, Atlanta, GA (US)

( * ) Notice: Subject to any disclaimer, the term of this patent is extended or adjusted under 35 U.S.C. 154(b) by 269 days.

(21) Appl. No.: 16/629,755

(22) PCT Filed: Jul. 13, 2018

(86) PCT No.: PCT/US2018/041935
§ 371 (c)(1),
(2) Date: Jan. 9, 2020

(87) PCT Pub. No.: WO2019/018213
PCT Pub. Date: Jan. 24, 2019

(65) Prior Publication Data
US 2021/0078232 A1 Mar. 18, 2021

Related U.S. Application Data

(60) Provisional application No. 62/534,265, filed on Jul. 19, 2017.

(51) Int. Cl.
*B29C 48/00* (2019.01)
*B29C 48/154* (2019.01)
(Continued)

(52) U.S. Cl.
CPC .......... *H01F 41/12* (2013.01); *B29C 48/022* (2019.02); *B29C 48/154* (2019.02); *B29C 48/21* (2019.02); *B29C 48/34* (2019.02); *B29C 48/92* (2019.02); *H01B 3/303* (2013.01); *H01B 13/143* (2013.01); *H01B 13/145* (2013.01);
(Continued)

(58) Field of Classification Search
None
See application file for complete search history.

(56) References Cited

U.S. PATENT DOCUMENTS

2006/0289189 A1   12/2006  Aisenbrey
2016/0304695 A1*  10/2016  Lyons ................ B29B 17/0026
(Continued)

OTHER PUBLICATIONS

European Search Report dated Mar. 30, 2021 for Application No. PCT/US2018041935.

*Primary Examiner* — Robert J Grun (57) ABSTRACT

Systems and methods for forming insulation on magnet wire are provided. An extruder that includes one or more rotating screws may receive a thermoset polymeric material and process the thermoset polymeric material to increase its pressure and temperature. An extrusion crosshead assembly in fluid communication with the extruder may receive the thermoset polymeric material and press extrude the thermoset polymeric material as insulation onto a magnet wire. A curing device may then cure the extruded insulation material.

20 Claims, 4 Drawing Sheets

(51) Int. Cl.
*B29C 48/21* (2019.01)
*B29C 48/34* (2019.01)
*H01B 13/14* (2006.01)
*H01B 3/30* (2006.01)
*H01F 5/06* (2006.01)
*H01F 41/12* (2006.01)
*B29C 48/92* (2019.01)
*B29K 101/10* (2006.01)
*H02K 3/32* (2006.01)
*H02K 15/10* (2006.01)

(52) U.S. Cl.
CPC ......... *H01B 13/146* (2013.01); *H01B 13/147* (2013.01); *H01B 13/148* (2013.01); *H01F 5/06* (2013.01); *B29K 2101/10* (2013.01); *B29K 2995/0007* (2013.01); *B29K 2995/0008* (2013.01); *H02K 3/32* (2013.01); *H02K 15/105* (2013.01)

(56) References Cited

U.S. PATENT DOCUMENTS

2018/0127897 A1* 5/2018 Song ................... B29C 48/0011
2020/0143987 A1* 5/2020 Amba ..................... B29C 48/92

* cited by examiner

SYSTEMS AND METHODS FOR FORMING MAGNET WIRE INSULATION WITH THERMOSET MATERIAL

CROSS-REFERENCE TO RELATED APPLICATION

This application claims priority to U.S. Provisional Application No. 62/534,265, filed Jul. 19, 2017 and entitled "Systems and Methods for Forming Extruded Magnet Wire Insulation," the contents of which is incorporated by reference herein in its entirety.

TECHNICAL FIELD

Embodiments of the disclosure relate generally to insulated magnet wire and, more particularly, to systems and methods for forming magnet wire with one or more thermoset polymeric insulation layers.

BACKGROUND

Magnetic winding wire, also referred to as magnet wire or winding wire, is used in a multitude of devices that require the development of electrical and/or magnetic fields to perform electromechanical work. Examples of such devices include electric motors, generators, transformers, actuator coils, etc. Typically, magnet wire is constructed by applying electrical insulation to a metallic conductor, such as a copper, aluminum, or alloy conductor. The electrical insulation is typically formed as a coating that provides for electrical integrity and prevents shorts in the magnet wire.

Many types of conventional insulation are formed from thermoset polymeric materials. A thermoset or thermosetting polymer is a material that may be irreversibly cured from a soft solid or viscous liquid (e.g., a powder, a paste that includes solvents, etc.) to an insoluble or cross-linked resin. Thermoset polymers typically cannot be melted for extruding as the melting process will break down or degrade the polymers. Accordingly, thermoset polymeric insulation layers are conventionally applied as polymeric enamel films. Typically, each enamel layer is applied as a varnish that is cured in an enameling oven. A plurality of layers are successively formed on one another until a desired enamel thickness or build is attained.

The traditional enamel insulation process is problematic for several reasons. First, the applied varnishes typically only contain between 15% and 23% solids by volume at the time of application. In other words, 76% to 85% of the applied material typically consists of solvent that is present only for the purpose of liquefaction and transportation of the polymeric solid material. Conventional solvents are typically highly volatile materials that must be handled with care and disposed of in a manner that satisfies environmental regulations. Additionally, during formation of an enamel layer, significant heating energy is required to drive off the solvents from the enamel and to crosslink the enamel to provide desired final properties. Many conventional enameling ovens are relatively inefficient with only a fraction of the applied heat being used in the enamel curing process. Accordingly, an opportunity exists for improved systems and methods for applying thermoset polymeric materials as magnet wire insulation. In particular, an opportunity exists for improved systems and methods that facilitate the paste extrusion or low solvent extrusion of thermoset polymeric materials as magnet wire insulation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the disclosure relate to systems and methods for forming thermoset magnet wire insulation via extrusion. A wide variety of thermoset polymeric materials may be extruded including, but not limited to, polyimide, polyamide-imide, polyester-polyimide, polyester, polyamide, polyurethane, polyvinyl formal ("Formvar"), and/or blends of two or more materials. The materials may be provided in any suitable form, such as in a powder form or in a low solvent form, to a suitable extruder, such as a single screw or a multi-screw extruder. The extruder may increase the pressure and/or temperature of the thermoset polymeric material and provide the material as a paste, semi-solid, viscous, slurry, or partially cross-linked material, to one or more suitable extrusion crossheads for extrusion or application onto one or more magnet wires. As desired, any number of filler materials and/or other materials may be added to a thermoset material either prior to providing the thermoset material to the extruder or while the thermoset material is in the extruder.

In certain embodiments, a thermoset polymeric insulation material may be formulated, compounded, and/or polymerized in tandem with the insulation material's extrusion. For example, one or more monomers, pre-polymers, raw materials, and/or other ingredients may be provided to a suitable extruder, such as a single screw or a multi-screw extruder. The extruder may perform additional mixing of the ingredients and may increase the pressure and/or temperature of the ingredients, thereby facilitating one or more polymerization and/or other reactions. In other words, one or more chemical reactions that result in the formation of a thermoset polymeric material from a plurality of ingredients may occur within the extruder. As desired, any number of filler materials, raw materials that are added at a subsequent point in a polymerization or other chemical process, may be added at one or more downstream locations within the extruder. The final insulation material may then be provided to one or more extrusion crossheads for extrusion or application onto one or more magnet wires.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
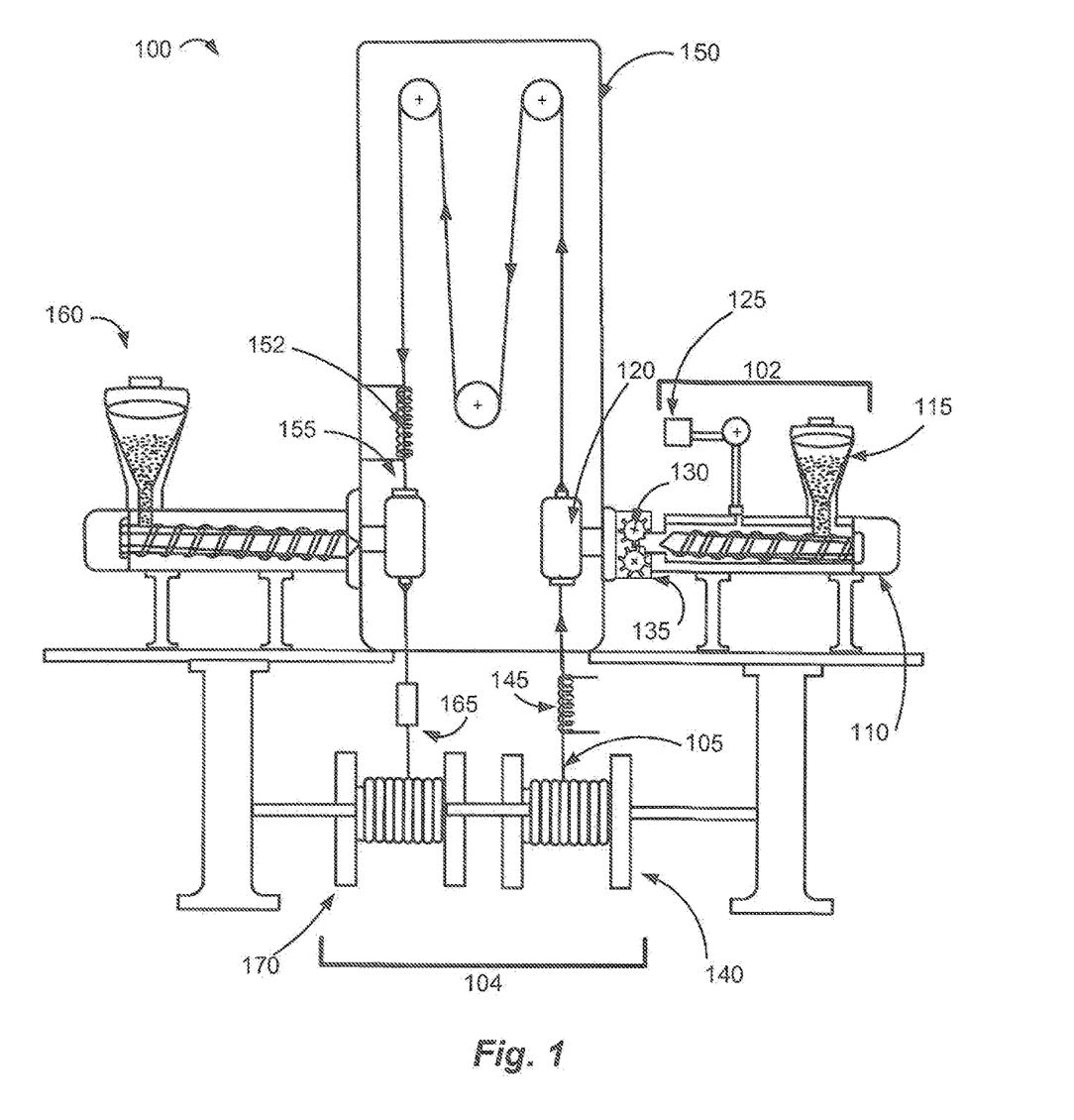
FIG. 1 illustrates a schematic diagram of an example system that may be utilized to process and extrude thermoset or similar insulation materials onto magnet wire, according to an illustrative embodiment of the disclosure.

FIG. 1 illustrates a schematic diagram of an example system 100 that may be utilized to form insulation on magnet wire, according to an illustrative embodiment of the disclosure. The system 100 may include a material processing system 102 configured to process an extrude thermoset polymeric materials. The thermoset polymeric material may be extruded onto a wire 105 in a continuous or inline manner. In other words, the material processing system 102 may operate in tandem with a wire line 104 to facilitate inline processing and extrusion of the thermoset polymeric material onto the wire 105.

With reference to FIG. 1, the material processing system 102 may include a suitable extruder 110 and one or more suitable feeder assemblies 115 configured to supply either a thermoset polymeric material or ingredients for a thermoset polymeric material to the extruder 110. As desired, the extruder 110 may be powered by one or more suitable motor assemblies. The extruder 110 may receive a thermoset polymeric material (or ingredients for a thermoset polymeric material) from the one or more feeder assemblies 115, and the thermoset polymeric material may be processed by the extruder 110 prior to being provided to one or more suitable extrusion crossheads 120 for extrusion onto the wire 105. As desired, one or more vacuum devolatilization devices 125, filtering devices, gear pumps 130, melt pumps 135, and/or other suitable devices may be utilized to further process insulation material prior to its extrusion and/or wire coating. Additionally, any number of suitable downstream feeder assemblies may be utilized to add additional components to the insulation material. In certain embodiments, one or more components of the material processing system 102 may be similar to those described in greater detail below with reference to FIG. 2.

In certain embodiments, the extruder 110 may be a single screw, twin screw, or other multi-screw extruder configured to process received materials prior to subsequent extrusion by one or more extrusion crossheads 120. According to an aspect of the disclosure, the extruder 110 may receive or formulate thermoset polymeric material and process the material such that it can be press, paste, or pressure extruded onto one or more wires 105. The extruder 110 may increase the pressure and temperature of the thermoset polymeric material in order to facilitate its extrusion.

Figure 2:
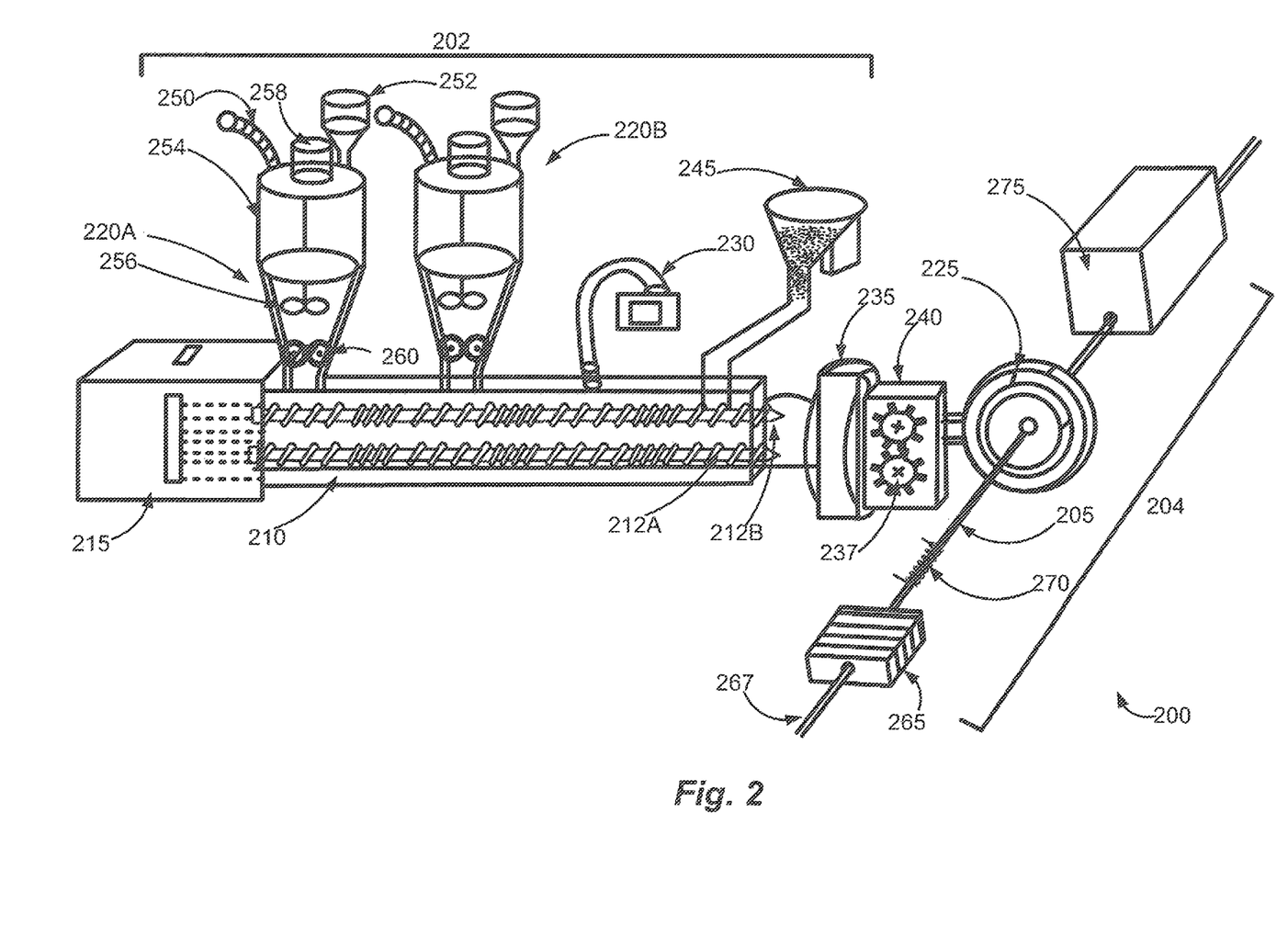
FIG. 2 is a schematic diagram of an example system that may be utilized to formulate and extrude a thermoset polymeric material onto magnet wire in a tandem or inline manner, according to an illustrative embodiment of the disclosure.

Any number of suitable feeder assemblies 115 may be utilized to provide thermoset polymeric material, ingredients for thermoset polymeric material, and/or other materials to the extruder 110. In certain embodiments, one or more feeder assemblies 115 may be configured to provide one or more thermoset polymeric materials to the extruder 210, for example, in a powder form or in a relatively low solvent form (e.g., a liquid or paste containing low solvent content). In the event that a thermoset polymeric material is provided in powder or solid form, a desired amount of solvent may be provided to the extruder 110 via a separate feeder assembly for mixing with the thermoset polymeric material to facilitate further processing within the extruder 110. In other embodiments, an extruder 110 may be configured to receive a plurality of ingredients and/or raw materials for a thermoset polymeric material from one or more feeder assemblies 115. The plurality of ingredients may be processed within the extruder 110 in order to trigger one or more polymerization and/or other chemical reactions that result in the thermoset polymeric material being formed within the extruder. FIG. 2 illustrates and describes an example extruder that may formulate a thermoset polymeric material from a plurality of ingredients. It will be appreciated that the extruder 110 of FIG. 1 may operate in a similar manner.

In certain embodiments, a thermoset polymeric material provided to, processed by, and/or formulated within the extruder 110 may have a relatively low solvent content that facilitates press, paste, or pressure extrusion. For example, a thermoset polymeric material may include a combination of polymeric solid material, solvent, and/or other materials (e.g., fillers, etc.), and the solvent content may be below approximately 5, 7, 8, 10, 12, 15, 17, 18, 20, 22, 25, 27, 28, or 30% by weight, or a solvent content included in a range between any two of the above values. The low solvent content may allow relatively thicker layers of thermoplastic polymeric material to be applied onto magnet wire relatively to conventional enamel layers.

The one or more feeder assemblies 115 may be positioned at any suitable location or combination of locations along the extruder 110. Additionally, each feeder assembly 115 may include any number of hoppers and/or other components configured to supply materials to the extruder 110. For example, a feeder assembly 115 may include one or more hoppers that utilize a loss-in-weight feeding mechanism that facilitates the relatively precise supply of thermoset polymeric material (or ingredients for a thermoset polymer material) to the extruder 110. As desired, a feeder assembly 115 may additionally include a mixing or stirring tank configured to mix or blend a plurality of ingredients (e.g., a thermoset polymeric material and one or more other types of materials such as solvent, a plurality of thermoset materials, etc.) together prior to the mixture being provided to the extruder 110 (e.g., provided by a suitable gear pump, etc.). Example feeder assemblies and their components are described in greater detail below with reference to FIG. 2.

A wide variety of suitable thermoset polymeric materials may be processed by the extruder 110 as desired in various embodiments. Examples of suitable thermoset polymeric materials that may be utilized include, but are not limited to, polyimide, polyamide-imide, polyester-polyimide, polyester, polyamide, polyurethane, polyvinyl formal ("Formvar"), polybenzimidazoles, etc. and/or blends of two or more materials. When cured, certain thermoset polymeric materials may form relatively rigid, three-dimensional cross-linked structures. The three-dimensional network of bonds may result in thermoset materials having increased strength relative to thermoplastic materials. As a result, thermoset materials may be better suited for certain types of high temperature magnet wire applications.

Many thermoset polymeric materials cannot be melt processed. In other words, prior to being cured a thermoset polymer may exist in a powder form, pellets, soft solid, or other solid form. Traditionally, in order to form insulation from a thermoset material, the thermoset material is suspended or mixed into a solvent solution to form a varnish. The varnish is then applied to a wire, and the wire is heated in an enameling oven in order to bake off the solvent and cure the thermoset insulation. This process is energy intensive, and only a portion (e.g., approximately 30-40%, etc.) of the heat generated in an oven is actually used to remove solvents. Due to the relatively high solvent content, relatively thin layers of varnish are applied to a wire, and it is often necessary to form multiple enamel layers in order to attain a desired insulation thickness or build. Solvents are also typically hazardous materials that may be subject to a wide variety of environmental regulations and restrictions.

By contrast, embodiments of the disclosure may process a thermoset polymeric material in a relatively low solvent form. For example, thermoset polymeric material may be provided to the extruder 110 in a powder form, highly viscous form, partially cross-linked or partially reacted form, or in a mixture with substantially lower solvent content than that utilized in conventional enamel systems. The extruder 110 may increase the pressure and/or temperature of the thermoset material prior to the thermoset material being provided to one or more extrusion crossheads 120. The extrusion crossheads 120, which may be similar to the extrusion crossheads discussed below with reference to FIG. 2, may then press, paste, or pressure extrude or apply the thermoset material onto one or more magnet wires 105 as a relatively high-pressure semi-solid material, as a slurry, or as a paste. In certain embodiments, a desired build and/or thickness of an extruded thermoset insulation layer may be controlled during the extrusion process (e.g., via one or more suitable extrusion tip and die assemblies, etc.).

The relatively low solvent convent (or lack of solvents) in the extruded material may permit a heavier or thicker build to be extruded relative to traditional varnish application. The higher solvent content with traditional varnish layers requires greater heat curing energy, thereby limiting the thickness of an applied layer. By contrast, press or paste extruding a thermoset polymeric material with relatively low solvent content allows similar amounts of curing energy to be utilized to cure a thicker insulation layer to remove desired amounts of solvent. In various embodiments, a thermoset polymeric material may be extruded with a thickness of approximately 0.02, 0.025, 0.03, 0.04, 0.05, 0.06, 0.075, 0.08, 0.10, 0.12, 0.125, 0.14, 0.15, 0.16, 0.175, 0.18, or 0.20 inches, a thickness included in a range between any two of the above values (e.g., a thickness between approximately 0.02 and approximately 0.20 inches, etc.), or a thickness included in a range bounded on either a minimum or maximum end by one of the above values. In certain embodiments, an insulation layer may be extruded with a desired thickness and/or build in a single pass. In other embodiments, a plurality of insulation layers (e.g., insulation layers formed from the same material or different materials, etc.) may be extruded in a plurality of operations by one or more suitable extrusion systems.

With continued reference to FIG. 1, in certain embodiments, one or more vacuum devolatilization devices 125 may be provided. Each vacuum devolatilization device 125 may remove undesirable materials, such as solvents and/or other liquids, from the extruder 110 as a thermoset polymeric material is processed. For example, at least a portion of the solvents required to facilitate the initial flow of thermoset polymeric material into and/or through the extruder 110 may be removed. Removal of solvents and/or other liquids may remove or reduce the need to dry insulation material, thereby resulting in improved efficiency and energy savings. For example, one or more devolatilization devices 125 may remove water and/or other liquids from a thermoset polymeric material, thereby eliminating the need to pre-dry the materials (e.g., dry out powdered thermoset material prior to processing, etc.). Example vacuum devolatilization devices are described in greater detail below with reference to FIG. 2, and that description is equally applicable to the devices 125 of FIG. 1.

Additionally, in certain embodiments, one or more downstream feeder assemblies may be configured to supply one or more insulation filler materials (e.g., inorganic materials, organic materials, one or more nanoparticles, one or more materials to be added subsequent to devolatilization, one or more materials to be added subsequent to polymerization, etc.) Each downstream feeder assembly may be positioned at any suitable location along the extruder 110 and may include similar components to the downstream raw material feeder discussed below with reference to FIG. 2. Similarly, as described in greater detail below with reference to the extruder of FIG. 2, one or more screw pitches within the extruder 110 may be widened or otherwise varied in order to receive materials and/or to facilitate devolatilization. Subsequent kneading blocks may include more narrow screw pitches to facilitate increased pressure, mixing, homogeneity, and/or triggering of polymerization and/or other chemical reactions. Additionally, as discussed with reference to the extruder of FIG. 2, any number of heating devices and/or temperature control channels may be positioned adjacent to and/or within the extruder 110.

Once processed by the extruder 110, a thermoset polymeric material may be provided to one or more suitable extrusion crossheads 120 for application onto one or more wires 105. In certain embodiments, the thermoset polymeric material may be passed through one or more suitable filtering device(s) prior to extrusion in order to remove unwanted materials and/or materials that are larger than a desired size. Any suitable filtering devices may be utilized as desired, such as devices similar to the filtering devices discussed below with reference to FIG. 2. Any number of suitable pumps may facilitate provision of insulation material from the extruder 110 to the extrusion crosshead(s) 120. For example, one or more suitable gear pumps 130 may be provided. A gear pump 130 may provide a wide variety of benefits in various embodiments, for example, increasing the pressure of an insulation material to be extruded, maintaining a desired consistency of the insulation material, and/or increasing or enhancing the throughput of the extruder 110. As another example, one or more suitable melt pumps 135 may maintain a desired temperature of the insulation material as it is provided to the crosshead(s) 120. The gear pumps 130 and melt pumps 135 may be similar to those discussed below with reference to FIG. 2.

The extrusion crosshead(s) 120 may be configured to apply thermoset polymeric material onto one or more wires 105 within a wire line 104. The wire line 104 may include a wide variety of suitable components and/or devices, and any number of the components/devices may be similar to those discussed below with reference to the wire line of FIG. 2. For example, the wire line 104 may include any number of suitable devices configured to provide one or more wires 105 to the extrusion crosshead(s) 120. As shown, a wire 105 may be formed in an offline manner and subsequently supplied or fed from a suitable payoff assembly 140 or other source. In other embodiments, a wire 105 may be processed and/or formed by a suitable wire drawing device, conform machine, or other suitable system, and the formed wire 105 may be provided to an extrusion crosshead 120 in an inline manner.

Additionally, the wire 105 may include a suitable conductor formed from any suitable electrically conductive material, for example, copper, aluminum, annealed copper, oxygen-free copper, silver-plated copper, nickel plated copper, copper clad aluminum ("CCA"), silver, gold, a conductive alloy, a bimetal, carbon nanotubes, carbon polyimide composite materials, or any other suitable electrically conductive material or combination of materials. Additionally, the wire 105 may be formed with any suitable dimensions and/or cross-sectional shapes. For example, the wire 105 may have a circular, elliptical, rectangular, square, or other suitable cross-sectional shape. As desired for certain cross-sectional shapes, such as a rectangular cross-sectional shape, a wire 105 or conductor may have corners that are rounded, sharp, smoothed, curved, angled, truncated, or otherwise formed.

In certain embodiments, the wire 105 may be a bare wire that is provided to the extrusion crosshead 120. In other embodiments, the wire 105 may include any number of base layers of insulation. For example, an insulated wire containing one or more base insulation layers may be provided from any suitable upstream devices or source devices (e.g., pay-offs, etc.). As another example, a wire 105 may be passed through one or a plurality of upstream systems or devices in order to form one or more base layers of insulation prior to the wire 105 being provided to the extrusion crosshead 120. Base insulation may include any suitable number of layers formed from a wide variety of suitable insulation materials. Example types of base insulation are described in greater detail below with reference to FIG. 2. Additionally, base insulation may be formed with any suitable thickness, builds, concentricity, and/or other dimensions. Indeed, a wire 105 may be formed or provided with any suitable number of layers and/or components prior to provision to an extrusion crosshead 120.

In certain embodiments, prior to extrusion of thermoset polymeric material on the wire 105, a temperature of the wire 105 may be controlled and/or modified. In this regard, the thermoset polymeric material may be applied to a wire 105 having a desired temperature or a temperature within a desired range. Temperature control may facilitate adhesion between the thermoset material and the conductor (or base insulation) and, in certain embodiments, may permit the use of a separate adhesive layer to be avoided. In other embodiments, an adhesive layer may be applied to the wire 105 prior to extrusion of a thermoset polymeric material. As desired, in various embodiments, one or more adhesion promoters may be added to the thermoset polymeric material prior to extrusion. A wide variety of suitable temperature control device(s) 145 may be utilized as desired in various embodiments. In certain embodiments, the wire 105 may be passed through one or more heating devices, such as one or more induction heating devices, heating coils, heaters, ovens, and/or any other suitable devices configured to increase or raise the temperature of the wire 105. In other embodiments, one or more cooling devices may be utilized as temperature control devices 145. The temperature of the wire 105 may be adjusted or controlled to achieve a wide variety of suitable values prior to extrusion of the thermoset polymeric material. For example, in certain embodiments, the temperature may be controlled to approximately 150° C., 175° C., 200° C., 225° C., 250° C., a temperature included in a range between any two of the above values, or a temperature included in a range bounded on either a minimum or maximum end by one of the above values (e.g., greater than 200° C., etc.).

Once a thermoset polymeric material has been applied or extruded onto the wire 105, the wire 105 may be passed through one or more suitable curing devices, systems, or stations 150. For example, the wire 105 may be passed through one or more suitable ovens that may heat the wire 105 in order to cure the thermoset material. During the curing, any remaining solvents may be evaporated and a relatively solid polymeric insulation layer may be formed on the wire 105. Due to the relatively low amount of solvents in the wire 105 following extrusion of a paste or semi-solid layer, the oven(s) may cure an insulation layer with a much greater thickness than traditional enamel layers. In this regard, a desired insulation thickness may be attained with a single pass through an extrusion system and oven or with only a few passes. Therefore, an amount of energy utilized to cure a thermoset insulation layer may be substantially reduced relative to conventional enameling methods and/or systems. Additionally, an amount of time required to process a wire 105 may be reduced as there will be no need to cure a relatively large number of successively formed layers of enamel. A wide variety of suitable enameling oven(s) may be utilized as desired in various embodiments, such as horizontal ovens, vertical ovens, gas ovens, electric ovens, or other suitable ovens. In other embodiments, other types of curing systems, methods, and/or techniques may be utilized as an alternative to or in addition to enameling oven(s). For example, infrared light curing devices, ultraviolet light curing devices, radiation curing devices, electron beam curing ("EBC") devices, variable frequency microwave ("VFM") curing devices, or other suitable curing systems may be utilized. Additionally, any number of curing devices and/or combinations of curing devices may be utilized as desired in various embodiments. As desired, the temperature of the wire 105 and associated extruded insulation may be controlled following the extrusion process. For example, the insulation may be heated following extrusion or other application to maintain a desired post-extrusion temperature. In certain embodiments, the process of cooling the extruded insulation prior to taking up the finished magnet wire or providing the wire 105 to one or more downstream systems may be controlled in order to attain any number of desirable characteristics, such as achieving a desired crystallinity. A wide variety of suitable devices may be utilized as desired to cool the wire 105, such as a liquid (e.g., water, etc.) bath.

Following curing of the extruded thermoset insulation material, the wire 105 may be provided to any number of suitable components and/or systems configured to perform additional processing. In certain embodiments, the wire 105 may be taken up or spooled for distribution or subsequent processing (i.e., subsequent processing performed in an offline manner, etc.). In other embodiments, the wire 105 may be provided to any number of suitable downstream devices configured to form additional insulation layers (e.g., an extruded layer, a bond-coat, a conformal layer, etc.). For example, as shown in FIG. 1, the wire 105 may be provided to a suitable extrusion crosshead 155 configured to form an additional layer of extruded insulation material on the wire 105 over the thermoset insulation. In certain embodiments, the extrusion crosshead 155 may be in communication with or associated with a suitable polymerization and/or extrusion system 160 configured to process a wide variety of suitable insulation materials, such as thermoplastic and/or thermoset insulation materials. In this regard, any number of extruded insulation layers (e.g., a thermoplastic topcoat, etc.) may be formed over the thermoset insulation. For example, a layer of PEEK or other thermoplastic insulation material may be formed over one or more layers of thermoset insulation material. As desired, one or more suitable temperature control device(s) 152, such as one or more induction heating devices, heating coils, heaters, ovens, and/or any other suitable devices, may be utilized to control the temperature of the wire 105 prior to extrusion of a subsequent layer of insulation.

In other embodiments, the wire 105 may be fed back to the extrusion crosshead(s) 120 in order to form another extruded thermoset insulation layer, and the wire 105 may subsequently be passed through the curing station 150. As another example, the wire 105 may be provided to a downstream system configured to form an additional extruded layer of a thermoset material. In yet other embodiments, an extrusion crosshead 120 may be suitable for co-extruding either multiple layers of the same material (e.g., a thermoset material) or multiple layers of different materials. For example, an extrusion crosshead 120 may co-extrude multiple layers of different materials formed and/or processed by different extruders. As desired, multiple thermoset layers or combinations of thermoset and thermoplastic layers may be co-extruded. Indeed, a wide variety of suitable devices and/or systems may be utilized to form any number of suitable insulation layers on the wire 105. Regardless of the number of insulation layers formed, in certain embodiments, the wire 105 may be passed through one or more suitable cooling devices 165 that cool the wire 105 following the formation of insulation. For example, the wire 105 may be passed through one or more suitable water cooling (e.g., water baths, etc.), liquid cooling, or air cooling devices or systems. The cooling rate may be controlled as desired. As a result of controlling the cooling rate of extruded insulation, any number of desirable characteristics may be achieved, such as achieving a desired crystallinity.

In certain embodiments, following the formation of insulation, the wire 105 may be provided to a suitable take-up station 170 or winding station configured to spool or otherwise take up the wire for distribution or subsequent processing. In other embodiments, the wire 105 may be provided to any number of suitable downstream processing devices and/or systems. For example, the wire 105 may be provided to one or more systems configured to form one or more conformal coatings on the wire 105, such as one or more coatings containing parylene. In yet other embodiments, the wire 105 may be provided to one or more suitable cutting and/or shaping systems configured to form any number of suitable hairpins, coils, shaped articles, and/or other assemblies from the wire 105 that are suitable for incorporation into an electric machine or other application. In yet other embodiments, the wire 105 may be provided to one or more suitable systems configured to use additive manufacturing or 3-D printing to form magnets on the extruded insulation. Indeed, a wide variety of suitable operations and/or additional processing may be conducted on the wire 105. As desired, additional processing may be conducted in an inline or offline manner.

The system 100 described above with reference to FIG. 1 is provided by way of example only. A wide variety of alternatives could be made to the system 100 as desired in various embodiments. Further, a wide variety of additional components may be incorporated into the system 100 as desired. As desired, the system 100 may also include any number of controllers or control devices, such as computers, microcontrollers, application specific circuit interfaces, programmable logic arrays, or other control devices that facilitate synchronization and/or configuration of any number of suitable system components. Indeed, the present disclosure envisions a wide variety of suitable systems that may be utilized to form magnet wire insulation.

As set forth above, in certain embodiments, a thermoset polymeric material may be polymerized and/or otherwise formulated within an extruder, such as the extruder 110 of FIG. 1. FIG. 2 illustrates a schematic view of an example system 200 that may be utilized to formulate and apply one or more suitable thermoset polymeric materials onto a wire 205, such as a magnet wire. As desired, the material processing system 102 and/or the wire line 104 incorporated into the system of FIG. 1 may include components similar to those described with reference to the system 200 of FIG. 2. The system 200 may include a polymerization system 202 that facilitates the polymerization, formulation, and/or other formation of one or more thermoset polymeric materials to be extruded. The formulated polymeric material may then be applied onto the wire 205 in a continuous or inline manner. In other words, the polymerization system 202 may operate in tandem with a wire line 204 to facilitate inline polymerization of thermoset material and application of the material onto the wire 205.

With reference to FIG. 2, the polymerization system 202 may include a suitable extruder 210 powered by one or more suitable motor assemblies 215. The extruder 210 may receive a plurality of ingredients for a thermoset polymeric material, such as one or more monomers, pre-polymers, raw materials, and/or reactants, from one or more suitable feeder assemblies (e.g., feeder assemblies 220A, 220B, etc.), and the plurality of ingredients may be processed by the extruder 210 in order to form the thermoset polymeric material within the extruder 210. The thermoset polymeric material may then be provided to one or more suitable extrusion crossheads 225 configured to extrude the thermoset material. Processing of the ingredients in the extruder 210 may facilitate polymerization, one or more chemical reactions, and/or other formulation of a thermoset material from the plurality of ingredients. As desired, one or more vacuum devolatilization devices 230, filtering devices 235, gear pumps 237, melt pumps 240, and/or other suitable devices may be utilized to further process the thermoset material prior to extrusion. Additionally, any number of suitable downstream feeder assemblies 245 may be utilized to add additional components to the polymeric material. Each of these components is described in greater detail below.

The extruder 210 may be any suitable device configured to receive a plurality of ingredients for a thermoset polymeric material and induce polymerization and/or other physicochemical transformations of the ingredients in order to form the thermoset material. In certain embodiments, the extruder 210 may be a single screw, twin screw, or other multi-screw extruder. In the event that the extruder 210 is a multi-screw extruder, any number of suitable screws may be utilized. In operation, ingredients may be mixed as they pass through the extruder 210. Additionally, the extruder 210 may increase or build pressure in the ingredients to facilitate polymerization and/or chemical reactions. The increased pressure may also result in increasing the temperature of the ingredients and/or a polymer melt formed from the ingredients, thereby resulting in the formation of a thermoset material that may be extruded onto the wire 205.

In conventional wire production processes, polymeric materials are typically produced in an offline manner through a series of chemical reactions. For example, thermoset polymers may be produced in relatively large reactors. The polymers are then either dried into a powder or blended with solvents to form a varnish. The powders or varnishes are then shipped or transferred to a wire production facility and provided to application equipment. For example, varnishes containing thermoset polymers may be provided to application dies. By contrast, the system 200 of FIG. 2 facilitates both the formulation of a thermoset material and the press, paste, or pressure extrusion of the thermoset material as wire insulation in a tandem or inline process. Additionally, the system 200 may facilitate the formulation of a thermoset material in a continuous process in a relatively smaller area than conventional offline processes.

As shown in FIG. 2, the extruder 210 may be a twin screw extruder that includes two intermeshed screws 212A, 212B that may each be rotated. However, the extruder 210 may include any number of screws. Each screw 212A, 212B may include a shaft with any number of threads or ridges extending from or formed on the shaft. In certain embodiments, the spacings or pitch between different portions of a thread or between different threads may be varied within a screw (generally referred to as screw 212) to facilitate desired reactions and/or functionality within the extruder 210. For example, certain sections of a screw 212 may include relatively larger or deeper thread spacings or a wider screw pitch, for example, to facilitate the addition of materials to the extruder 210 and/or to facilitate the vacuuming or other removal of volatile and/or unwanted substances. Other sections of a screw 212 may include narrower thread spacings or a narrower screw pitch to facilitate ingredient melting, mixing, kneading, and/or pressurization. As desired, thread spacings may be made progressively smaller or more narrow in order to gradually increase pressure and temperature and/or to force mixing and/or polymerization.

One or more suitable motor assemblies 215 may drive the extruder 210. For example, the one or more motor assemblies 215 may turn and/or maintain torque on the screws 212A, 212B within the extruder 210. A motor assembly 215 may include any number of suitable motors, rotating electric machines, and/or other devices configured to produce mechanical energy. In certain embodiments, a motor assembly 215 may be configured to provide energy to a suitable gearbox assembly that turns and/or maintains torque on the screws 212A, 212B. Additionally, a motor assembly 215 may be controlled via any number of suitable control devices, such as one or more processor-driven devices and/or computing devices. In certain embodiments, the output of a motor assembly 215 may be adjusted in order to provide desired torque on the screws 212A, 212B. The desired torque may be based upon a wide variety of suitable factors, such as the number of screws included in an extruder 210, the types of ingredients processed by the extruder 210, a type of thermoset material formulated or polymerized in the extruder 210, the operating speed or line speed of the wire line 204, etc.

A wide variety of suitable thermoset polymeric materials may be formulated within the extruder 210, such as any of the materials described above with reference to FIG. 1. In other embodiments, a blend of two or more thermoset materials may be formed. For example, a plurality of separate extruders may be utilized to formulate two or more thermoset materials that will be blended or mixed together to form magnet wire insulation. As desired, multiple separate polymeric materials may either be blended within one of the extruders (e.g., extruder 210, etc.) or within another suitable component or device (e.g., a mixing tank, etc.) prior to the blend or mixture being provided to an extrusion crosshead 225. Any suitable polymeric blends may be formulated and/or utilized as desired in various embodiments, such as blends of any of the thermoset materials discussed above. Additionally, any suitable blending rates, mixing rates, or blending ratios may be utilized when two or more thermoset materials are combined together.

With continued reference to FIG. 2, a wide variety of suitable ingredients or raw materials may be provided to the extruder 210 via one or more suitable feeder assemblies 220A, 220B. The ingredients provided by one or more feeder assemblies 220A, 220B may be based at least in part upon a thermoset polymeric material to be formulated within the extruder 210. Ingredients and/or raw materials for a thermoset material may include, for example, one or more monomers, pre-polymers, reactants, powders, solvents, and/or other suitable materials. Additionally, various ingredients may be provided in any suitable forms and/or phases, such as solids and/or liquids.

Any number of feeder assemblies, such as assemblies 220A, 220B, may be utilized as desired to provide ingredients to the extruder 210. In the event that a plurality of feeder assemblies 220A, 220B is utilized, the various feeder assemblies 220A, 220B may be positioned at any suitable location or combination of locations along the extruder 210, such as a plurality of longitudinally spaced locations along the extruder 210. For example, a first feeder assembly 220A may provide material to the extruder 210 at a first location along a longitudinal length of the extruder 210, and a second feeder assembly 220B may provide material to the extruder 210 at a second location along the longitudinal length of the extruder 210 offset downstream from the first location. In this regard, ingredients may be provided at desired locations that correspond to respective stages or phases of a polymerization or other formulation process. Additionally, as desired, any number of feeder assemblies may be positioned at any given location along a longitudinal length of the extruder 210. For example, one or multiple feeder assemblies may provide respective ingredients to the extruder 210 at a given location within the operating area of the extruder 210.

A feeder assembly (generally referred to as feeder assembly 220) may include any number of suitable components configured to provide one or more ingredients to the extruder 210. In certain embodiments, a feeder assembly 220 may additionally include one or more components configured to mix, blend, or otherwise combine two or more ingredients prior to the mixture being provided to the extruder 210. As shown, a feeder assembly 220 may include one or more hoppers 250, 252 and/or similar components configured to supply ingredients or raw materials to a stirring or mixing tank 254. Any number of hoppers may be utilized as desired in conjunction with a feeder assembly 220, and each hopper may be configured to supply any suitable materials and/or combinations of materials. For example, a powder hopper 250 may be configured to provide solid raw materials in a powder form. As another example, a pre-polymer hopper 252 may be configured to provide one or more monomers and/or pre-polymers in liquid or any other suitable form. A wide variety of suitable types of hoppers may be utilized as desired, such as bottom hoppers, live hoppers, tilt hoppers, etc. Additionally, a hopper may utilize any suitable type of feeding mechanism. In certain embodiments, one or more hoppers may utilize a loss-in-weight feeding mechanism that facilitates precise supply of material to the stirring tank 254.

The stirring tank 254 or mixing tank may receive materials from the hoppers 250, 252 and mix or stir the materials together prior to the mixture being supplied to the extruder 210. In certain embodiments, one or more reactions between the raw materials may occur within the stirring tank 254. The stirring tank 254 may include any number of suitable agitators 256 or other components that facilitate stirring or mixing of the raw materials. The agitator(s) 256 may be powered or driven by one or more suitable motors 258. Once materials are mixed in the stirring tank 254, one or more suitable gear pumps 260 may pump, feed, or otherwise supply the mixture to the extruder 210. Although a single stirring tank 254 is illustrated in FIG. 2, in other embodiments, a plurality of stirring tanks may be incorporated into a feeder assembly 220. As an alternative to incorporating one or more stirring tanks 254 into a feeder assembly 220, one or more hoppers may be configured to supply material directly to the extruder 210.

As set forth above, the extruder 210 may process received ingredients and/or materials in order to facilitate completion of a polymerization process, one or more chemical reactions, and/or formation of a thermoset polymeric material. As set forth above, a screw pitch within the extruder 210 may be widened and/or otherwise varied as desired to accommodate feeding of materials and/or ingredients. Once fed into the extruder 210, materials may be forced through a kneading block or portion of the extruder 210 with a relatively narrow screw pitch to facilitate mixing and/or formation of a homogenous material.

In certain embodiments, one or more components or devices may be configured to remove unwanted materials from the extruder 210 and/or the thermoset material formulated within the extruder 210. For example, one or more vacuum devolatilization device(s) 230 may be configured to vacuum out solvents, moisture, and/or other unwanted substances. Any number of vacuum devolatilization devices 230 may be utilized as desired, and each device 230 may be positioned at any suitable location along the extruder 210. In certain embodiments, a portion of one or more screws 212A, 212B positioned proximate to a vacuum devolatilization device 230 may have a wider screw pitch to facilitate removal of unwanted substances. The screw pitch(es) may then be narrowed subsequent to vacuum devolatilization, for example, to form a kneading block that assists in mixing, enhancing homogeneity, heating, and/or pressurizing material within the extruder 210.

In certain embodiments, one or more downstream raw material feeder(s) 245 may provide materials to the extruder 210 downstream of the feeder assemblies 220A, 220B. For example, a downstream raw material feeder 245 may be configured to supply one or more insulation filler materials (e.g., inorganic materials such as metals, transition metals, lanthanides, actinides, metal oxides, and/or hydrated oxides of suitable materials such as aluminum, tin, boron, germanium, gallium, lead, silicon, titanium, chromium, zinc, yttrium, vanadium, zirconium, nickel, glass fibers, etc.; suitable organic materials such as polyaniline, polyacetylene, polyphenylene, polypyrrole, other electrically conductive particles; any suitable combination of materials, etc.), one or more nanoparticles, one or more materials or ingredients to be added subsequent to devolatilization, and/or one or more materials to be added at a downstream point in a polymerization process. Any suitable materials and/or combinations of materials may be provided by one or more downstream raw material feeders 245.

A downstream raw material feeder 245 may be positioned at any suitable location along the extruder 210. For example, a downstream raw material feeder 245 may be positioned at any suitable longitudinal location. In certain embodiments, a downstream raw material feeder 245 may feed material into the top of the extruder 210 or into a side of the extruder 210. Additionally, a downstream raw material feeder 245 may include any suitable components. As shown, a downstream raw material feeder 245 may include one or more hoppers similar to those described above for the feeder assembly 220. In other embodiments, a downstream raw material feeder 245 may include one or more suitable stirring or mixing tanks, gear pumps, and/or a wide variety of other suitable components. Additionally, in certain embodiments, one or more screw pitches within the extruder 210 may be widened in order to receive material, and a subsequent kneading block or portion may include a more narrow screw pitch following the receipt of material.

In certain embodiments, a downstream raw material feeder 245 may have or include a feed component having a single, twin, or other multi-screw design in order to facilitate material feeding into the extruder 210. At the same time, the raw material feeder 245 may reduce or avoid pressurized polymer leakage out of the extruder 210. During operation, the feeder 245 may apply force to the supply of raw material introduced into the extruder 210. In this regard, leakage of a pressurized and/or relatively low viscous polymer material may be reduced. In other embodiments, a downstream raw material feeder 245, such as a side feeder, may operate as a vacuum port with precisely designed gaps or spaces that are small enough (e.g., under 0.05 inches, etc.) to allow vacuum suction of volatile material from the polymer being formulated within the extruder 210. In this regard, the raw material feeder 245 may also be used as a vacuum port for polymers. For example, if a side feeder is positioned at a location where the thermoset material within the extruder 210 has a relatively high viscosity, then leakage of the thermoset material may be less likely. Accordingly, a side feeder or other raw material feeder 245 may be utilized to draw or vacuum out solvents, liquids, and/or other volatile or unwanted material. Use of a multi-screw side feeder may facilitate self-wiping of a polymer sticking to a side feeder screw while also applying force to introduce raw materials and/or recirculate polymer back into the extruder 210.

During typical processing of a thermoset material within the extruder 210, a majority of the heat (e.g., approximately 80%, etc.) imparted on the thermoset material may be provided by the screw(s) 212A, 212B torque increasing pressure. As desired, a wide variety of other temperature control devices may be incorporated into the extruder 210 and/or utilized in conjunction with the extruder 210. For example, one or more heating devices (e.g., heating coils, induction heating devices, etc.) may be positioned within the extruder 210 and/or adjacent to a body or outer shell of the extruder 210 in order to provide additional heating. As another example, any number of channels suitable for carrying a temperature control fluid may be formed within the extruder 210 (e.g., adjacent to the screw(s) 212A, 212B, etc.). These channels may be configured to carry or circulate any suitable fluids (e.g., water, oil, refrigerants, air, etc.) utilized to heat, cool, and/or otherwise control the temperature at any desired locations within the extruder 210. For example, desired temperatures may be maintained and/or otherwise controlled within the extruder 210 in order to enhance or trigger desired chemical reactions. Once a fluid is circulated through the extruder 210 in one or more channels, the fluid may be provided to any suitable devices (e.g., heaters, cooling baths, compressors, etc.) external to or outside of the extruder 210 in order to adjust the temperature of the fluid prior to recirculation within the extruder 210. Additionally, any suitable control devices and/or sensors (e.g., temperature sensors, etc.) may be utilized in conjunction with the one or more channels and/or external devices to maintain desired temperatures.

Once a thermoset polymeric material has been formulated, polymerized, and/or otherwise processed by the extruder 210, the thermoset material may be provided to one or more suitable extrusion crossheads 225 for application onto one or more wires 205. In certain embodiments, the thermoset material may be passed through one or more suitable filtering device(s) 235 prior to extrusion. The filtering may remove unwanted materials and/or materials that are larger than a desired size. These larger materials may result in beading and/or other undesired conditions within an insulated magnet wire. In one example embodiment, a sliding or continuous screen changer may be provided as a filtering device 235. The continuous screen changer may include at least one revolving disk that rotates at a desired velocity, such as approximately one inch per hour. Additionally, one or more mesh or screen filters may be incorporated into or attached to the disk. As thermoset material passes through the filter(s), unwanted materials may be filtered out. Rotation of the disk may then permit the filter(s) to be cleaned as sections of the filter(s) rotate outside of an insulation material flow path. A wide variety of other suitable filtering devices and/or combinations of filtering devices may be utilized as desired in other embodiments.

Any number of suitable pumps may facilitate provision of thermoset material from the extruder 210 to one or more extrusion crosshead(s) 225 in fluid communication with the extruder 210. For example, one or more suitable gear pumps 237 may be provided. A gear pump 237 may provide a wide variety of benefits in various embodiments, for example, increasing the pressure of the thermoset material to be extruded, maintaining a desired consistency of the thermoset material, and/or increasing or enhancing the throughput of the extruder 210. As another example, one or more suitable melt pumps 240 may maintain a desired temperature of the thermoset material as it is provided to the crosshead(s) 225.

In certain embodiments, one or more extrusion crosshead (s) 225 may receive thermoset material formulated in the extruder 210. Any number of extrusion crossheads 225 may be utilized as desired. Each extrusion crosshead 225 may include any suitable components configured to press, paste, or pressure extrude the thermoset material onto one or more wires 205. In certain embodiments, an extrusion crosshead 225 may apply thermoset material onto a single wire 205. In other embodiments, a plurality of wires may be passed through one or more extrusion crossheads in tandem and thermoset material may separately be applied to each wire. In yet other embodiments, a wire 205 may have a first insulation layer formed from a first thermoset material applied by the extrusion crosshead 225 and a second insulation layer formed form a second insulation material (e.g., material formed in a separate extruder, etc.) applied by a second extrusion crosshead 225. In yet other embodiments, a wire may be passed through an extrusion crosshead assembly multiple times (e.g., passed through different portions of a crosshead assembly, etc.) in order to receive multiple layers of insulation. Indeed, a wide variety of suitable extrusion crossheads and/or combinations of crossheads may be utilized as desired in various embodiments.

In certain embodiments, an extrusion crosshead 225 may include one or more extrusion tips, dies, and/or other components that facilitate extrusion of the thermoset material. As desired, various component dimensions (e.g., tip and die sizes, etc.), land configurations (e.g., land lengths, land sizes, etc.), and/or other component parameters, (e.g., tip and/or die drool, torque, back pressure, etc.), configurations, or arrangements may be utilized within an extrusion crosshead 225 to provide a desired extrusion profile of the insulation material.

With continued reference to FIG. 2, the wire line 204 may be configured to provide one or more wires 205 to the polymerization system 202 for application of the thermoset material by the extrusion crosshead 225 or other application assemblies. The wire line 204 may include a wide variety of suitable components and/or devices. As shown, the wire line 204 may include a wire drawing device 265, one or more temperature control devices 270, and/or one or more curing systems 275. A wire drawing device 265, rod mill, or rod breakdown machine may receive input material 267 (e.g., wire stock, a larger conductor, etc.) from a suitable source (e.g., a payoff, a reel, etc.) and draw the input material 267 through one or more dies in order to reduce the dimensions of the input material 267 to desired dimensions for the wire 205. As desired, one or more flatteners, rollers, and/or other suitable devices may be utilized to flatten one or more sides of the input material 267. In this regard, a rectangular wire or wire having another desired cross-sectional shape may be formed in certain embodiments. A wire drawing device 265 may include any number of suitable capstans or pulling devices that pull or draw the input material through the die(s), and any suitable motors may power the capstan(s).

In other embodiments, the wire 205 may be formed from input material 267 via a suitable continuous extrusion or conform machine. For example, a conform machine may receive input material 267 from a payoff or other source, and the conform machine may process and/or manipulate the input material to produce a desired wire conductor via extrusion. In yet other embodiments, a preformed wire 205 may be provided or received from a suitable payoff or other source. In other words, a wire 205 may be preformed in an offline process or obtained from an external supplier. Regardless of how the wire 205 is formed, a wide variety of other suitable devices may operate on the wire 205 prior to extrusion of thermoset insulation material, such as an annealer and/or one or more wire cleaning devices. The wire 205 may include a conductor formed from any suitable electrically conductive material, such as any of the materials described above for the wire 105 of FIG. 1. Additionally, the wire 205 may be formed with any suitable dimensions and/or cross-sectional shapes. For example, the wire 205 may have a circular, elliptical, rectangular, square, or other suitable cross-sectional shape. As desired for certain cross-sectional shapes, such as a rectangular cross-sectional shape, a wire 205 or conductor may have corners that are rounded, sharp, smoothed, curved, angled, truncated, or otherwise formed.

In certain embodiments, the wire 205 may be a bare wire provided to the extrusion crosshead 225. In other embodiments, the wire 205 may include any number of base layers of insulation. For example, rather than drawing or otherwise forming a wire from input material, an insulated wire may be provided from any suitable upstream devices or source devices (e.g., payoffs, etc.). As another example, a wire 205 may be passed through one or a plurality of upstream systems or devices in order to form one or more base layers of insulation prior to the wire 205 being provided to the extrusion crosshead 225. For example, an upstream extrusion crosshead may be utilized to form a base layer of extruded insulation material on the wire 205. As another example, one or more upstream devices (e.g., one or more application dies and/or curing ovens, etc.) may be utilized to form one or more base enamel layers on the wire 205. Examples of suitable base insulation include, but are not limited to, one or more extruded layers of insulation, one or more layers of enamel (e.g., polyimide, polyamide-imide, amide-imide, polyester, polyester-imide, polyamide, etc.), one or more layers of semi-conductive material, one or more tape or wrap layers, etc. Base insulation may include any suitable number of layers formed from a wide variety of suitable insulation materials. Additionally, base insulation may be formed with any suitable thickness, builds, concentricity, and/or other dimensions.

In certain embodiments, prior to extrusion of thermoset polymeric material on the wire 205, a temperature of the wire 205 may be controlled and/or modified. In this regard, the thermoset material may be applied to a wire 205 having a desired temperature or a temperature within a desired range. Temperature control may facilitate adhesion between the thermoset material and the conductor (or base insulation) and, in certain embodiments, may permit avoidance of a separate adhesive layer. In other embodiments, an adhesive layer may be applied to the wire 205 prior to extrusion of thermoset material. As desired in various embodiments, one or more adhesion promoters may be added to the thermoset polymeric material prior to extrusion (e.g., blended with the thermoset material during formulation, added by a downstream feeder, etc.). A wide variety of suitable temperature control device(s) 270 may be utilized as desired in various embodiments. In certain embodiments, the wire 205 may be passed through one or more heating devices, such as one or more induction heating devices, heating coils, heaters, ovens, and/or any other suitable devices configured to increase or raise the temperature of the wire 205. In other embodiments, one or more cooling devices may be utilized as temperature control devices 270. The temperature of the wire 205 may be adjusted or controlled to achieve a wide variety of suitable values prior to extrusion or other application of the insulation material. For example, in certain embodiments, the temperature may be controlled to approximately 150° C., 175° C., 200° C., 225° C., 250° C., a temperature included in a range between any two of the above values, or a temperature included in a range bounded on either a minimum or maximum end by one of the above values (e.g., greater than 200° C., etc.). In yet other embodiments, the wire 205 may be surface treated (e.g., plasma treated, UV treated, etc.) in order to modify a surface topography of the wire 205 in order to promote adhesion of an extruded thermoset material.

In certain embodiments, following extrusion of the thermoset material, the insulation may be cured by any number of suitable curing systems 275 and/or curing devices, such as an enameling oven. Other example curing systems include, but are not limited to, radiation curing devices, electron beam curing ("EBC") devices, variable frequency microwave ("VFM") curing devices, ultraviolet ("UV") curing devices, etc. Any number of curing devices 275 and/or combinations of curing devices may be utilized as desired. Curing may provide a wide variety of desirable benefits, for example, chemical cross-linking, enhancing heat resistance, heat shock, and/or other temperature performance parameters, enhancing chemical resistance, and/or enhancing abrasion resistance. As desired, the temperature of the wire 205 and applied insulation may be controlled following application and/or curing of the insulation. For example, the process of cooling the extruded and cured insulation prior to taking up the finished magnet wire or providing the wire 205 to one or more downstream systems may be controlled. As a result of controlling the cooling rate of the insulation, any number of desirable characteristics may be achieved, such as achieving a desired crystallinity. A wide variety of suitable devices may be utilized as desired to cool the wire 205, such as a liquid (e.g., water, etc.) bath.

Following curing of the insulation material, the wire 205 may be provided to any number of suitable components and/or systems configured to perform additional processing. In certain embodiments, the wire 205 may be taken up or spooled for distribution or subsequent processing (i.e., subsequent processing performed in an offline manner, etc.). In other embodiments, the wire 205 may be provided to any number of suitable downstream devices configured to form additional insulation layers (e.g., an extruded layer, a bondcoat, a conformal layer, etc.). For example, the wire 205 may be fed back to the extrusion crosshead(s) 225 in order to form another thermoset insulation layer. As another example, the wire 205 may be provided to a downstream system configured to form an additional insulation layer, such as an extruded layer formed from a different set of one or more insulating materials. As yet another example, the wire 205 may be provided to one or more systems configured to form one or more conformal coatings on the wire 205, such as one or more coatings containing parylene. In yet other embodiments, the wire 205 may be provided to one or more suitable cutting and/or shaping systems configured to form any number of suitable hairpins, coils, shaped articles, and/or other assemblies from the wire 205 that are suitable for incorporation into an electric machine or other application. In yet other embodiments, the wire 205 may be provided to one or more suitable systems configured to use additive manufacturing or 3-D printing to form magnets (e.g., rare earth magnets, etc.) on the extruded insulation. Indeed, a wide variety of suitable operations and/or additional processing may be conducted on the wire 205. As desired, additional processing may be conducted in an inline or offline manner.

The system 200 described above with reference to FIG. 2 is provided by way of example only. A wide variety of alternatives could be made to the system 200 as desired in various embodiments. Further, a wide variety of additional components may be incorporated into the system 200 as desired. As desired, the system 200 may also include any number of controllers or control devices, such as computers, microcontrollers, application specific circuit interfaces, programmable logic arrays, or other control devices that facilitate synchronization and/or configuration of any number of suitable system components. Indeed, the present disclosure envisions a wide variety of suitable systems that may be utilized to form magnet wire insulation.

Figure 3:
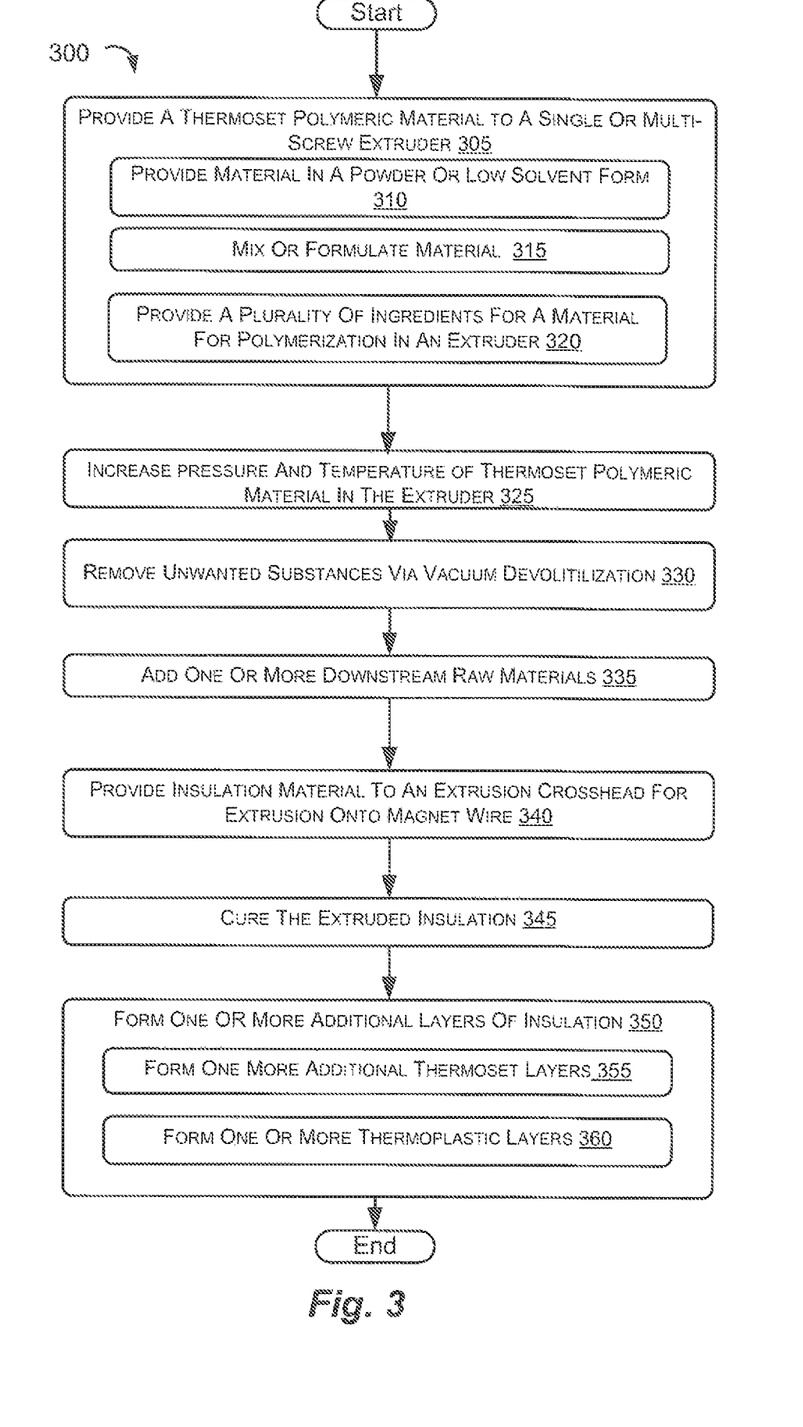
FIG. 3 illustrates a flow chart of an example method for extruding one or more thermoset polymeric materials as insulation on magnet wire, according to an illustrative embodiment of the disclosure.

FIG. 3 illustrates a flow chart of an example method 300 for extruding one or more thermoset polymeric materials as insulation on magnet wire, according to an illustrative embodiment of the disclosure. The method 300 may be carried out by any suitable processing and extrusion system, such as the systems 100, 200 described above with reference to FIGS. 1 and 2. The method 300 may begin at block 305. At block 305, a thermoset polymeric material, such as any of the materials discussed above with reference to FIG. 1, may be provided to a suitable single or multi-screw extruder. A thermoset polymeric material may be provided in a wide variety of suitable forms. For example, at block 310, a thermoset polymeric material may be provided in a powder form or in a relatively low solvent form. The thermoset polymeric material may be formulated in an offline manner and subsequently provided to the extruder. As another example, at block 315, a thermoset polymeric material may be mixed formulated in a system in fluid communication with the extruder, and the formulated thermoset material may be provided to the extruder in an in-line or continuous manner. As yet another example, at block 320, a plurality of ingredients or raw materials for a thermoset polymeric material may be provided to the extruder, and the thermoset material may be polymerized and/or formulated within the extruder. An example process for formulating a thermoset polymeric material within an extruder is described in greater detail below with reference to the method 400 of FIG. 4. As desired, a portion or all of the method 400 of FIG. 4 may be implemented at block 320.

At block 325, the extruder may process the thermoset polymeric material to increase its pressure and/or temperature. In this regard, the thermoset material may be processed into a paste, slurry, or semi-solid state suitable for press, paste, or pressure extrusion. At block 330, a wide variety of unwanted substances may be removed from the thermoset material via one or more suitable vacuum devolatilization and/or other suitable devices. For example, undesirable amounts of solvents, water, other liquids, and/or other unwanted materials may be removed as the thermoset material is processed within the extruder. At block 335, which may be optional in certain embodiments, one or more downstream raw materials may be added to the extruder. For example, one or more filler materials and/or one or more materials to be added following devolatilization may be added to the extruder as downstream materials.

At block 340, the thermoset material may be provided by the extruder to one or more suitable extrusion crossheads for extrusion or application onto one or more magnet wires as insulation. For example, the thermoset material may be press extruded as a suitable paste, slurry, or semi-solid onto one or more magnet wires. As desired, the extrusion may be controlled to facilitate the formation of an insulation layer with a desired thickness and/or build. Additionally, in certain embodiments, the insulation material may be processed by any number of suitable filtering devices prior to extrusion by the extrusion crosshead(s). Once the thermoset material has been extruded onto the wire, the extruded insulation may be cured at block 345. A wide variety of suitable devices, systems, and/or techniques may be utilized in order to cure the extruded insulation. For example, the thermoset insulation material may be cured in one or more ovens (e.g., an enameling oven, etc.), via radiation curing devices, electron beam curing ("EBC") devices, variable frequency microwave ("VFM") curing devices, and/or ultraviolet ("UV") curing devices.

In certain embodiments, the method may end following block 345. For example, the magnet wire may be taken up following curing of the insulation material. In other embodiments, a wide variety of additional processing may be performed on the wire at block 350 prior to the method's 300 completion. For example, at block 355, one or more additional layers of thermoset polymeric insulation may be formed on the wire. As another example, at block 360, one or more layers of thermoplastic polymeric insulation may be extruded or otherwise formed on the wire. As another example, one or more conformal layers may be formed. As yet another example, one or more magnet wires may be cut and/or formed into any desired number of assemblies. The method 300 may then end following formation of additional insulation and/or other further processing.

Figure 4:
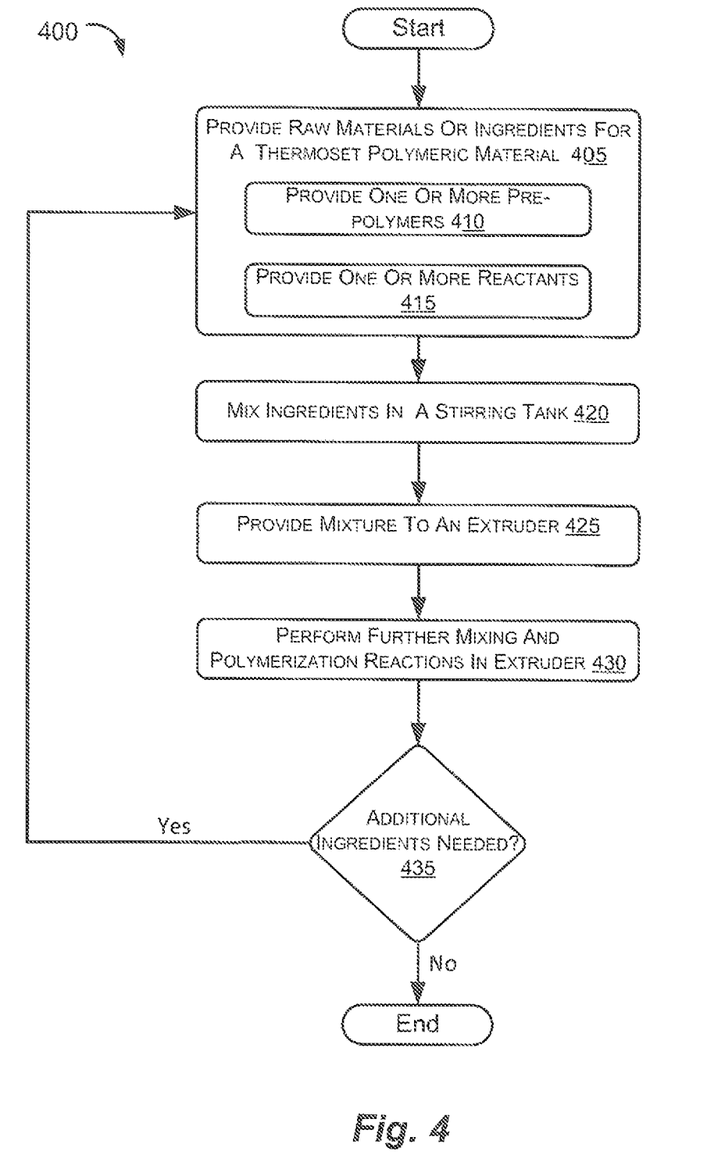
FIG. 4 illustrates a flow chart of an example method for formulating a thermoset polymeric material within an extruder prior to extrusion of the material as insulation on magnet wire, according to an illustrative embodiment of the disclosure.

FIG. 4 illustrates a flow chart of an example method 400 for formulating a thermoset polymeric material within an extruder. The method 400 may be carried out by any suitable extruder and/or processing system, such as any of the systems 100, 200 described above with reference to FIGS. 1 and 2. In certain embodiments, a portion or all of the method 400 may be carried out at block 320 with respect to the method 300 of FIG. 3. The method 400 may begin at block 405. At block 405, a plurality of ingredients and/or raw materials for a thermoset polymeric material may be provided. A wide variety of suitable ingredients may be provided as desired in various embodiments. For example, at block 410, one or more monomers and/or pre-polymers may be provided. As another example, at block 415, one or more reactants may be provided. As desired, powders, solid materials, and/or other ingredients may be provided. The ingredients may be provided via any number of suitable devices, such as one or more suitable hoppers and/or feeding assemblies.

At block 420, the provided ingredients may optionally be stirred, blended, or otherwise mixed together in a suitable stirring tank or other suitable mixing device. The mixture may then be provided to a suitable extruder, such as a single or multi-screw extruder, at block 425. At block 430, the extruder may facilitate further mixing as it processing the ingredients. Additionally, the extruder may facilitate the onset and/or completion of a wide variety of chemical reactions between the ingredients. For example, the extruder may increase the temperature and/or pressure of the ingredients, thereby facilitating one or more polymerization and/or other reactions between the plurality of ingredients in order to form a desired thermoset polymeric material within the extruder.

At block 430, a determination may be made as to whether additional ingredients for the thermoset polymeric material are desired or needed. If it is determined at block 430 that additional ingredients are desired, then operations may continue at block 405, and one or more additional ingredients may be provided. For example, additional ingredients for the thermoset polymeric material may be provided to the extruder by a feeder assembly that is situated longitudinally downstream from one or more feeder assemblies that have previously provided ingredients to the extruder. In this regard, respective ingredients may be provided to the extruder at various desired positions or locations within a polymerization process. If, however, it is determined at block 435 that no additional ingredients are desired, then operations may end.

The operations described and shown in the methods 300, 400 of FIGS. 3 and 4 may be carried out or performed in any suitable order as desired in various embodiments. Additionally, in certain embodiments, at least a portion of the operations may be carried out in parallel. Furthermore, in certain embodiments, less than or more than the operations described in FIGS. 3 and 4 may be performed.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forming insulation on a winding wire, the method comprising:
providing, to an extruder comprising one or more rotating screws, a thermoset polymeric material containing less than thirty percent by weight of solvent;
processing the thermoset polymeric material within the extruder to increase its temperature and pressure;
press extruding the thermoset polymeric material as insulation on a magnet wire; and
curing the extruded insulation material.

2. The method of claim 1, wherein providing a thermoset polymeric material comprises providing a thermoset polymeric material as a powder.

3. The method of claim 1, wherein providing a thermoset polymeric material comprises providing a thermoset polymeric material in a solution containing less than twenty percent by weight of solvent.

4. The method of claim 1, wherein providing a thermoset polymeric material comprises:
providing a plurality of ingredients for the thermoset polymeric material to the extruder; and
processing the plurality of ingredients within the extruder to facilitate polymerization of the thermoset polymeric material.

5. The method of claim 1, wherein providing a thermoset polymeric material comprises providing one of (i) polyimide, (ii) polyamide, or (iii) polyamide imide.

6. The method of claim 1, wherein press extruding the thermoset polymeric material comprises extruding the thermoset polymeric material as a paste, a slurry, or as a semi-solid.

7. The method of claim 1, further comprising:
removing one or more unwanted substances from the extruder via vacuum devolatilization.

8. The method of claim 1, further comprising:
filtering the thermoset polymeric material prior to press extruding the thermoset polymeric material.

9. The method of claim 1, further comprising:
adding one or more filler materials to the extruder for mixing with the thermoset polymeric material prior to extrusion.

10. The method of claim 1, wherein curing the extruded insulation material comprises heat curing the extruded insulation material in an oven.

11. A method for forming insulation on a winding wire, the method comprising:
providing, to an extruder comprising one or more rotating screws, a thermoset polymeric material containing less than thirty percent by weight of solvent;
processing the thermoset polymeric material within the extruder to increase its temperature and pressure;
press extruding the thermoset polymeric material as insulation on a magnet wire; and
processing the magnet wire with a curing device that cures and further removes solvent from the extruded thermoset polymeric material.

12. The method of claim 11, wherein providing a thermoset polymeric material comprises providing a thermoset polymeric material as a powder.

13. The method of claim 11, wherein providing a thermoset polymeric material comprises:
providing a plurality of ingredients for the thermoset polymeric material to the extruder; and
processing the plurality of ingredients within the extruder to facilitate polymerization of the thermoset polymeric material.

14. The method of claim 11, wherein providing a thermoset polymeric material comprises providing one of (i) polyimide, (ii) polyamide, or (iii) polyamide imide.

15. The method of claim 11, wherein press extruding the thermoset polymeric material comprises extruding the thermoset polymeric material as a paste, a slurry, or as a semi-solid.

16. The method of claim 11, further comprising:
removing one or more unwanted substances from the extruder via vacuum devolatilization.

17. The method of claim 11, further comprising:
filtering the thermoset polymeric material prior to press extruding the thermoset polymeric material.

18. The method of claim 11, further comprising:
adding one or more filler materials to the extruder for mixing with the thermoset polymeric material prior to extrusion.

19. The method of claim 11, wherein processing the magnet wire with a curing device comprises processing the magnet wire in an oven.

20. A system for forming insulation on magnet wire, the system comprising:
an extruder comprising one or more rotating screws, wherein the extruder is adapted to receive a thermoset polymeric material containing less than thirty percent solvent by weight and process the thermoset polymeric material to increase its pressure and temperature;
an extrusion crosshead assembly in fluid communication with the extruder and adapted to press extrude the thermoset polymeric material as insulation onto a magnet wire; and
a curing device adapted to cure the extruded insulation material and further remove solvent from the extruded insulation material.

* * * * *